Oct. 3, 1961 R. A. CHAPELLIER 3,002,774
AUTOMATIC COUPLING

Filed Sept. 26, 1957 3 Sheets-Sheet 1

INVENTOR.
R. A. CHAPELLIER
BY
Eldon H. Luther
ATTORNEY

*INVENTOR.*
R. A. CHAPELLIER
BY Eldon H. Luther
ATTORNEY

United States Patent Office 3,002,774
Patented Oct. 3, 1961

3,002,774
AUTOMATIC COUPLING
Robert A. Chapellier, Whitestone, N.Y., assignor to Combustion Engineering, Inc., New York, N.Y., a corporation of Delaware
Filed Sept. 26, 1957, Ser. No. 686,479
7 Claims. (Cl. 287—103)

This invention relates to coupling or latching devices for releasably retaining two separate members in predetermined relation with each other and has relation to such devices wherein the latching and unlatching action is automatically obtained in a very confined space solely through vertical movement of the actuator.

It is sometimes necessary to obtain an automatic and positive coupling and uncoupling action between two members which are movable relative to each other only in a vertical direction with this coupling and uncoupling action being obtained in a very confined space. This requirement prevails in connection with certain industrial processes that take place within pressure vessels and wherein structural elements must be vertically lowered into and withdrawn from the vessel and while in the vessel must be positively secured in place with space requirements in the vessel being extremely acute. For the purpose of explanation, the invention will be described in such an environment although it is to be understood that this is by way of explanation only, for the invention may be used in other and different environments.

In accordance with the present invention there is provided a frame which has a vertically disposed opening therein and which is adapted to have lowered thereinto a member that is to be supported by and releasably retained in the frame. This member has a shoulder which engages a complementary shoulder formed on the frame and limits the insertion of the member into the opening. In order to secure this member within the frame when the member is in its proper position in the frame with these shoulders in engagement there is provided on the member a suitable latching mechanism. This mechanism includes a yoke that extends upwardly from the member and within which is received a stem which is vertically movable within the yoke and extends from the upper end of the yoke. The upper end of the stem is formed so as to be engaged by suitable actuating or manipulating mechanism while the lower end of the stem, which is disposed between the upright legs of the yoke, is enlarged and bifurcated and has a pair of levers positioned between the arms of the bifurcate and extending in opposite horizontal directions. These levers are pivotally mounted upon a suitable shaft or pin which is in turn secured to the lower end of the stem passing between and through the arms of the bifurcate with the ends of this pin being received in suitable vertically elongated slots provided in the yoke so that vertical movement of the stem is limited by the vertical extent of these slots. The frame is provided at its upper end with a pair of downwardly disposed surfaces which are positioned in spaced relation above a pair of upwardly disposed surfaces provided on the upper end of the member when the member is in seating relation within the frame with the aforementioned complementary shoulders in engagement. These faces while being vertically spaced are not horizontally offset to any great extent and the two sets of these faces are arranged so that the outer extremities of the levers will be positioned therebetween when the stem is in its lowermost position thereby effectively locking the member within the frame. Upon raising the stem the levers are pivoted so that the outer ends thereof are drawn inwardly when the stem is in its uppermost position with suitable stop being provided and engaged by the levers so as to insure that they are completely withdrawn from their locking position between the vertically spaced faces but the outer ends thereof remain disposed above the respective upwardly disposed face provided on the member. Thus upon lowering the stem the outer ends of the levers will engage these respective faces so as to pivot the levers in a manner so the outer ends will again be disposed between the respective vertically spaced faces. The stem is urged downwardly to its lower or innermost position by means of a spring interposed between the upper end of the yoke and the lower end of the stem with the force developed by this spring being less than the weight of the member and its attachments so that by lifting upwardly on the stem the spring will be compressed and the levers moved to their unlatched position before attempting to withdraw the member from the frame and when the member is being lowered into the frame the levers will remain in this unlatched position until the member is properly seated within the frame with the shoulder of the member being in engagement with the shoulder of the lever.

It is an object of this invention to provide an improved coupling or latching mechanism for releasably coupling two members together and which is actuatable solely through vertical movement of an actuator.

Other and further objects of the invention will become apparent to those skilled in the art as the description proceeds.

With the aforementioned objects in view, the invention comprises an arrangement, construction and combination of the elements of the inventive organization in such a manner as to attain the results desired as hereinafter more particularly set forth in the following detailed description of an illustrative embodiment, said embodiment being shown by the accompanying drawing wherein.

Figure 1:
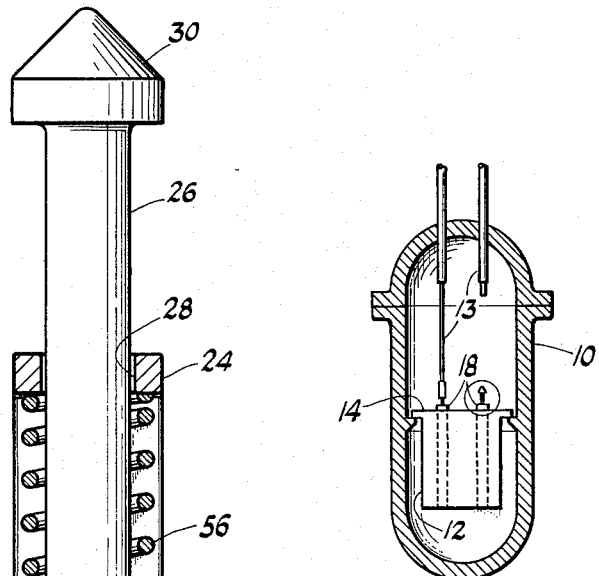
FIG. 1 is a diagrammatic illustration in the form of a vertical section of a pressure vessel in which a suitable process is to be carried out and showing vertically movable members retained within a suitable frame secured within the vessel.

Referring now to the drawing, wherein like reference characters are used throughout to designate like elements, there is shown therein a pressure vessel 10 such as may be employed for any desired reaction to be conducted under high pressure and within which is provided frame 12 for retaining various mechanism or apparatus within the vessel. Extending into and removably held within frame 12 are numerous elements 18 which are adapted to be vertically removed from and deposited in this frame and for this purpose actuating mechanism extends through the cover of the vessel with this mechanism illustratively taking the form of actuating rods 13 that may be automatically coupled to and uncoupled from the elements. At the upper end of frame 12 is plate 14 which is provided with numerous openings 16 into each of which there is adapted to be vertically lowered an elongated element 18 which is preferably snugly received within the opening. The elements 18 may be of any desired cross section with one preferred configuration being illustrated wherein they are square with the openings 16 corresponding with the configuration of the elements. Each of the elements is provided with a downwardly facing shoulder 20 which is complementary with an upwardly facing shoulder 22 provided on the plate 14. By means of these complementary shoulders the insertion of elements 18 within frame 12 is positively limited and when the element is properly positioned and seated within the frame these shoulders 20 and 22 are in engagement.

In order that elements 18 may be positively retained within the frame member 12 after being lowered into place therewithin and still be removed upwardly from the frame when desired a suitable latch mechanism is mounted on each of the members and is actuated in response to insertion and withdrawal of the element from the frame.

As embodied, this latch includes upwardly extending body or yoke 24 within which is disposed stem 26 which extends through opening 28 in the bridge or upper end of the yoke. This stem is vertically movable within the yoke 24 and is provided at its upper end with conical head 30 in order that it may be grasped by a suitable manipulating device, while the lower end of the stem is enlarged, as shown, so that it is snugly but slidably received between the legs of the yoke with this enlarged lower end portion thereby acting to guide the stem as it moves vertically within the yoke and providing an upwardly facing flange or surface 32. This enlarged lower end of the stem is bifurcated, forming arms 31 and 33 between which are positioned the oppositely extending levers 34 and 36 with these levers being pivotally mounted on pin 38 that is mounted in and extends between the arms 31 and 33. The extremities of pin 38 are received within vertically elongated slots 40 provided on the upright legs of yoke 24 with the disposition of this pin in these slots also being effective to guide the lower end of stem 24 during its vertical movement within the yoke and limiting the extent of the vertical movement of the stem within the yoke.

When an element 18 is properly seated within frame 12 the upper end of the element is received within the walls 42 provided in plate 14. At a location adjacent the outer ends of levers 34 and 36 these walls are provided with slots 44 which present the downwardly disposed face or surface 46. Located inwardly of or below this surface 46 when shoulders 20 and 22 are in engagement is the upwardly disposed face or surface 50 formed on the upper end of skirt or flange 48 which forms a part of member 18.

Figure 2:
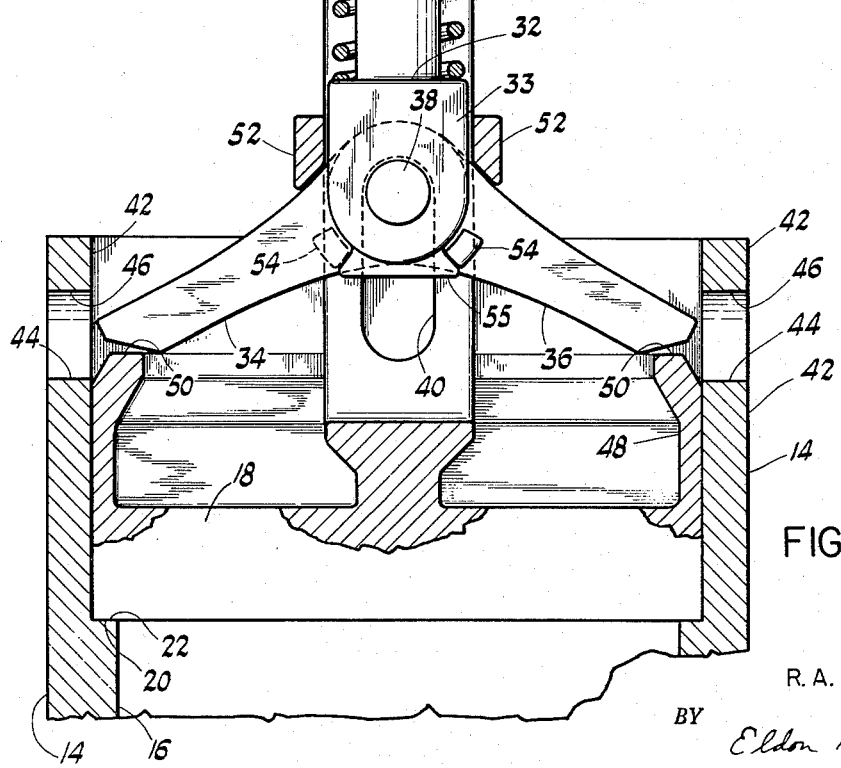
FIG. 2 is a detailed vertical sectional view of the latching mechanism of the invention shown in the unlatched position with this view being an enlarged showing of the mechanism continued generally within the circle shown in FIG. 1.

When stem 26 is in its uppermost position, with pin 38 engaging the upper extremity of the slots 40, levers 34 and 36 are disposed as shown in FIG. 2 with their outer end located within the walls 42 or in other words, not extending laterally from member 18 and positioned immediately above the skirt 48 and accordingly the surface 50. The levers are retained in this position by means of the stops 54 provided on each lever and which engage the complementary stop member 55 formed on the lower end of stem 26. In order to positively insure that the levers will be disposed in this position when the stem is in its uppermost position stops 52 are secured to the yoke 24 to engage the upper surface of the levers and move them to the position where stops 54 and 55 are in engagement.

Figure 3:
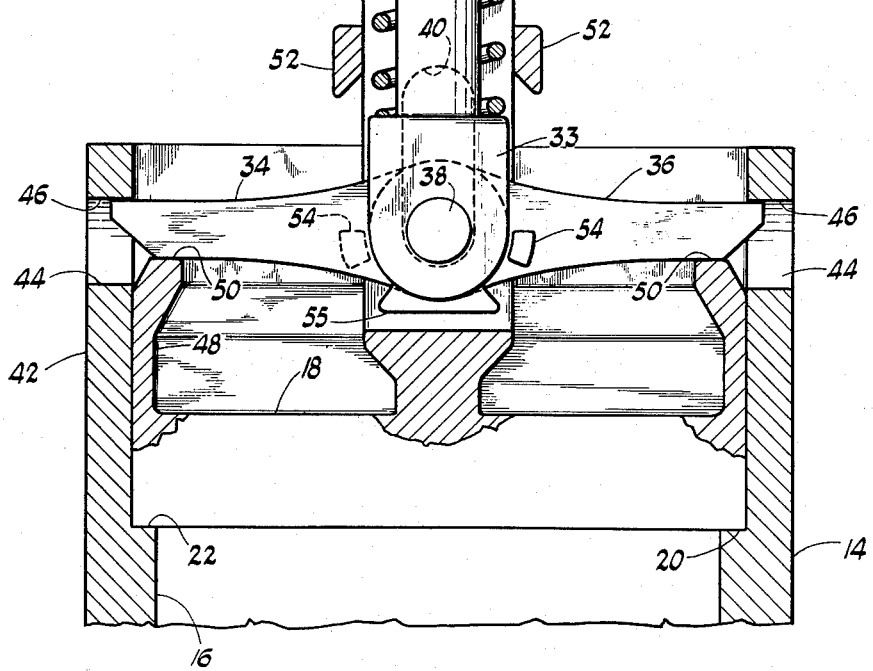
FIG. 3 is a view similar to that of FIG. 2 but showing the latching mechanism in its latched or locked position.
Figure 4:
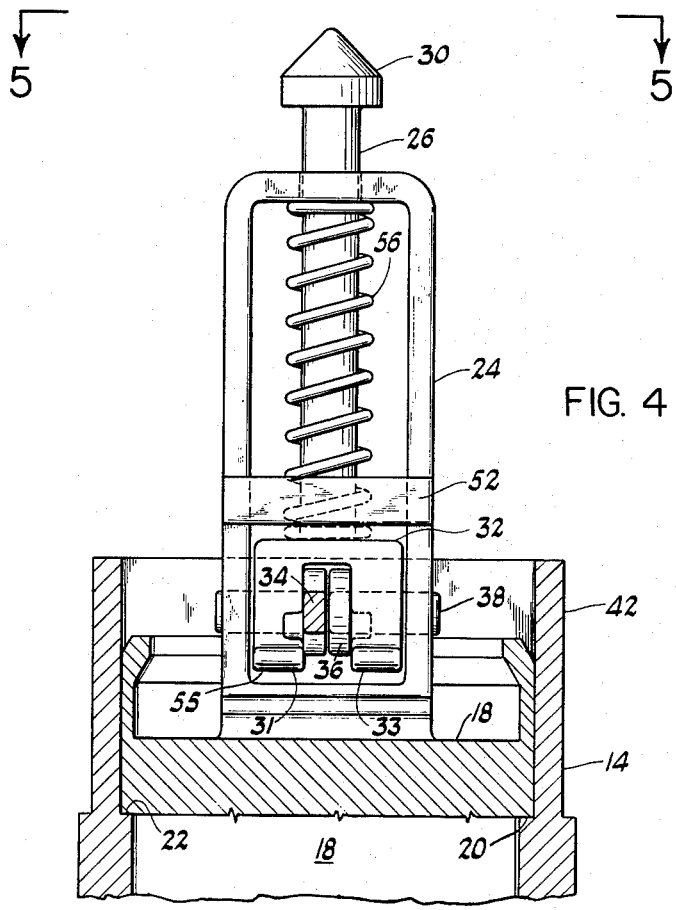
FIG. 4 is a sectional view taken generally along line 4—4 of FIG. 3.
Figure 5:
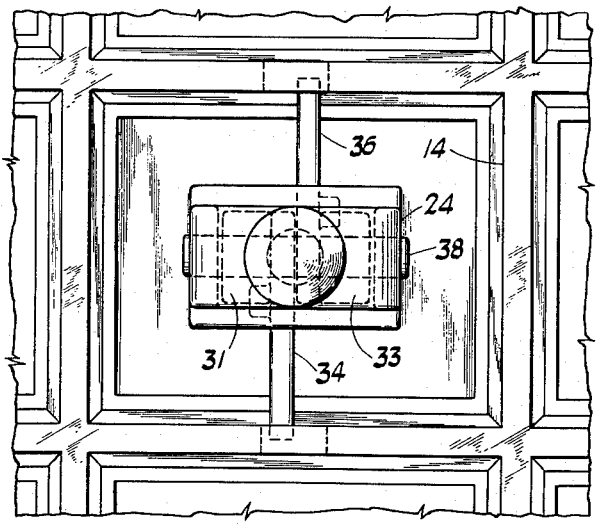
FIG. 5 is a top view of one of the latching mechanisms taken generally from line 5—5 of FIG. 4.

Upon lowering stem 26 from its uppermost position the outer ends or portions of each of the levers 34 and 36 engage the upper end of skirt 48 with these outer ends being suitably chamfered so that lever 36 is pivoted counterclockwise about pin 38 and lever 34 clockwise about this pin as the stem moves downwardly with the levers moving outwardly into slots 44 and being snugly received between the vertically spaced faces 46 and 50 and in engagement with these faces, FIG. 3 shows the latch mechanism in this position. With the levers extending into slots 44 and engaging the faces 46 and 50 the element 18 is locked within the frame 12 and cannot be removed from the frame until stem 26 is moved to its uppermost position and the levers withdrawn from their locked position. The stem 26 is urged to its lowermost position by means of spring 56 which is disposed about the stem and interposed between the upper end of yoke 24 and flange 32 formed on the lowermost end of the stem. This spring is effective to move the stem to its lowermost position when the actuating rod 13 is released from the stem. However, the spring is specifically chosen so that the force developed by the spring is less than the weight of member 18 and its various attachments in order that the stem will occupy its uppermost position when the element is supported by the actuating rod 13 through the stem.

In operation, when an element 18 is lowered into the frame 12 it is supported from rod 13 with this rod then being coupled to stem 26 by means of a suitable coupling device that engages the conical head 30. When thus supported, stem 26 occupies its uppermost position as shown in FIG. 2 with the levers 34 and 36 being positioned in their contact or unlatching position. When element 18 is lowered into frame 12 to its proper location where shoulders 20 and 22 are in engagement rod 13 is released from stem 26 and spring 66 is effective to move stem 26 to its lowermost position with the levers 34 and 36 then occupying their locked position between surfaces 44 and 46, shown in FIG. 3, and with element 18 being locked within frame 12. In removing an element from the frame a reverse operational procedure is effected with rod 13 being coupled to stem 26 and the stem elevated against the bias or spring 56 from its FIG. 3 to its FIG. 2 position with this being effected prior to any attempt being made to lift the element from the frame since the weight of the element and its attachments is greater than the force of spring 56. Thus the levers are moved to their unlatching position and then upon continued upward movement of rod 13 the element is removed from the frame.

Thus with the present invention a simple yet very effective latching organization is provided wherein only vertical movement of the actuator is required so that latching or unlatching may be accomplished in a confined environment.

While I have illustrated and described a preferred embodiment of my novel organization it is to be understood that such is merely illustrative and not restrictive and that variations and modifications may be made therein without departing from the spirit and scope of the invention. I therefore do not wish to be limited to the precise details set forth but desire to avail myself of such changes as fall within the purview of my invention.

What is claimed is:

1. In an organization of the type described the combination of a support frame, a member insertable downwardly into said frame, means supporting said member in said frame at a predetermined location and means operative to releasably retain the member within the frame against upward movement and including a housing secured to said member, a vertically disposed stem mounted in said housing and extending from the upper end thereof with the upper end of said stem adapted to have an actuator secured thereto, said stem being vertically movable within said housing between an upper and a lower position, said stem having an upwardly facing shoulder spaced below a downwardly facing surface on the housing spring means interposed between said shoulder and surface urging said stem to its lower position with a force that is less than the weight of said member and its attachments so that when the member is supported from the stem, the stem occupies its upper position, a locking lever secured to said stem for pivotal movement about a generally horizontal axis, means on said member and said frame for receipt of said lever there-between to prevent withdrawal of the member from the frame, said lever being disposed intermediate these last-named means when the stem is in its lower position and withdrawn from intermediate said member and frame permitting withdrawal of the member from the frame when said stem is in its upper position.

2. The organization of claim 1 wherein there are a pair of levers in generally opposed relation to each other.

3. In an organization of the type described the combination of a support frame, a member insertable downwardly into said frame, means supporting said member in said frame at a predetermined location and means operative to releasably retain the member within the frame against upward movement and including a housing secured to said member, a vertically disposed stem mounted in said housing and extending well above the upper end of the housing with the upper end of said stem adapted to have an actuator secured thereto, said stem being vertically movable within said housing between an upper and a lower position said stem having an upwardly facing shoulder spaced below a downwardly facing surface on the housing, spring means interposed between said shoulder and surface urging said stem to its lower position with a force that is less than the weight of said member and its attachements so that when the member is supported from the stem, the stem occupies its upper position, a locking lever secured to said stem for pivotal movement about a generally horizontal axis and occupying a radial outward position with respect to said stem when the stem is in its lower position and a radial inward position when the stem is in its upper position, said frame having a downward presented face and said member having an upward presented face disposed below said downwardly presented face and laterally adjacent thereto when said member is at said predetermined location, said lever being snugly interposed between and cooperating with these surfaces when in its outward position and withdrawn from therebetween when in its inward position.

4. The organization of claim 3 wherein the lever is disposed immediately above the upward presented face of the member when the stem is in its upper position and the lever is in its radial inward position and engages the same for pivotal movement to its outward position upon downward movement of the stem.

5. The organization of claim 3 including stop means effective to retain the lever in its inward position when the stem occupies its upper position.

6. The organization of claim 3 wherein there are two of said levers pivoted to said stem and extending generally in opposite directions.

7. In an organization of the type described the combination of a support frame, a member insertable downwardly into said frame, means supporting said member in said frame at a predetermined location and means operative to releasably retain the member within the frame against upward movement and including an inverted U-shaped housing secured to and extending upwardly from said member, a vertically disposed stem extending up through a bore provided in the web portion of said housing, the upper end of the stem being adapted to have an actuator secured thereto and the lower end of the stem being enlarged to rather closely fit between the legs of said housing and having a horizontal shaft disposed thereon the opposite ends of which are slidably received in vertical slots in the legs of the housing, said stem being vertically movable in said housing between an upper and a lower position, spring means interposed between said web portion of the housing and the enlarged portion of the stem to urge the stem to its lower position with a force that is less than the weight of said member and its attachments so that when the member is supported from the stem the stem occupies its upper position, a pair of locking levers disposed on said shaft for pivotal movement and extending generally in opposite directions, the levers occupying radial outward positions with respect to said stem when the stem is in its lower position and radial inward positions when the stem is in its upper position, said frame having a pair of downwardly presented faces and said member having a complementary pair of upwardly presented faces disposed below said downwardly presented faces and laterally adjacent thereto when said member is at said predetermined location, said levers being snuggly interposed between these vertically spaced surfaces when in their outward position and withdrawn from therebetween when in their inward position, a pair of abutments extending between the legs of the housing with one engaging each lever to pivot the levers to their inward positions with the ends thereof above said upwardly presented face on said member.

References Cited in the file of this patent
UNITED STATES PATENTS

| | | |
|---|---|---|
| 943,127 | Van Boven | Dec. 14, 1903 |
| 2,492,815 | Robinson | Dec. 27, 1949 |
| 2,494,159 | Bernstein | Jan. 10, 1950 |
| 2,499,712 | Armstrong | Mar. 7, 1950 |
| 2,516,382 | Hazel | July 25, 1950 |